United States Patent [19]
Leray et al.

[11] Patent Number: 5,637,363
[45] Date of Patent: Jun. 10, 1997

[54] GLASS PANE HAVING A PERIPHERAL STRIP, AND METHOD OF MANUFACTURING SAME

[75] Inventors: Stéphane Leray; Patrick Janvier, both of Sully sur Loire; Yves Naoumenko, Bray en Val, all of France

[73] Assignee: Saint-Gobain Vitrage, Courbevoie, France

[21] Appl. No.: 490,632

[22] Filed: Jun. 15, 1995

[30] Foreign Application Priority Data

Jun. 16, 1994 [FR] France ................... 94 07379

[51] Int. Cl.⁶ ........................................... B32B 9/00
[52] U.S. Cl. ........................ 428/34; 428/38; 428/81; 428/142; 428/189; 428/192; 428/412; 428/424.8; 428/426; 428/437; 156/106; 156/107; 156/109; 156/522; 52/203; 52/308; 52/394
[58] Field of Search .................. 428/412, 38, 81, 428/189, 192, 34, 424.8, 425.6, 437, 426, 142, 83; 156/522, 99, 106, 107, 109; 52/308, 203, 394

[56] References Cited

U.S. PATENT DOCUMENTS

| | | |
|---|---|---|
| 2,650,890 | 9/1953 | Bledsoe ............................ 52/208 |
| 2,758,042 | 7/1956 | Raymond et al. ................ 52/208 |
| 3,410,739 | 11/1968 | Orcutt . |
| 3,671,370 | 6/1972 | Littell, Jr. . |
| 4,046,951 | 9/1977 | Stefanik . |
| 4,321,777 | 3/1982 | Sauret et al. ..................... 52/308 |
| 5,268,049 | 12/1993 | Marriott et al. . |

OTHER PUBLICATIONS

Abstract of EP-A-0 014 141 Indicating the US Equivalency is US 4,321,777 (A Copy is Enclosed) date Aug. 6, 1980.
Abstract of EP-A-0 490,580 Indicating the US Equivalency is US 5,268,049 (A Copy is Enclosed) date Jun. 17, 1992.

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

A laminated glass pane having at least one rigid glass sheet and one flexible plastic material sheet is described, which has a peripheral strip disposed over at least a part of the edge of the pane over at least one edge of a flexible plastic sheet. The peripheral strip has two layers of respectively different materials, a first layer designated the "internal layer", is comprised of a material having a softening temperature which is less than or equal to the temperature employed in autoclaving the sheets which are components of the pane, and a second layer designated the "external layer", is comprised of a material having a softening temperature which is greater than the temperature employed in autoclaving the sheets.

13 Claims, 3 Drawing Sheets

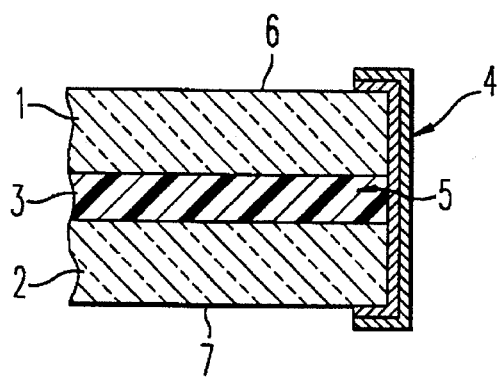
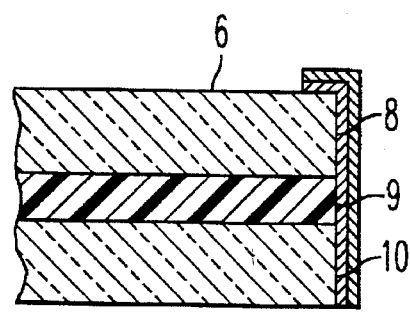
FIG. 1a    FIG. 1b
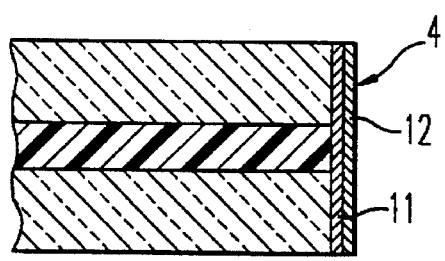
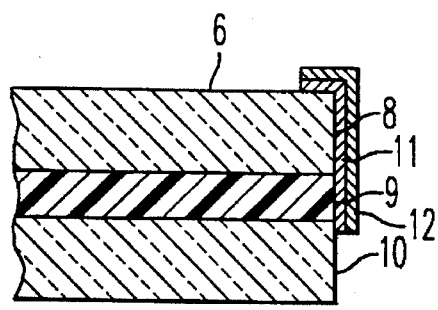
FIG. 1c    FIG. 1d
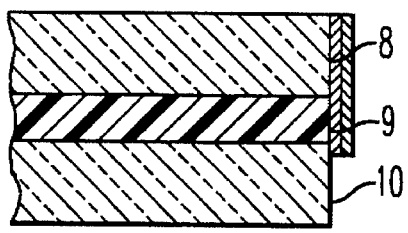
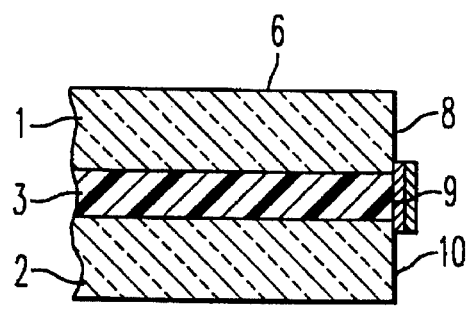
FIG. 1e    FIG. 1f

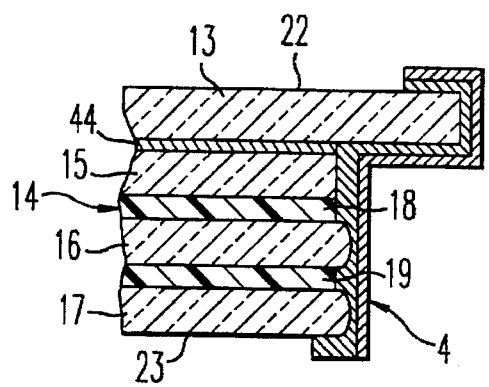
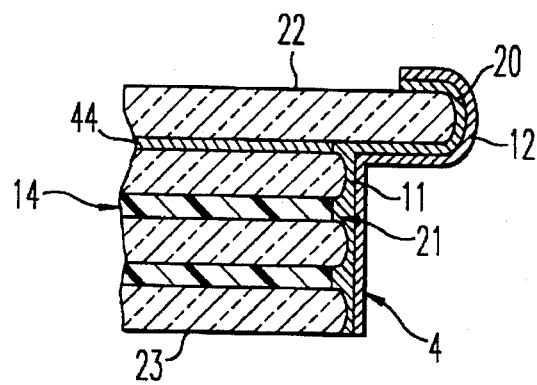
FIG. 2a
FIG. 2b
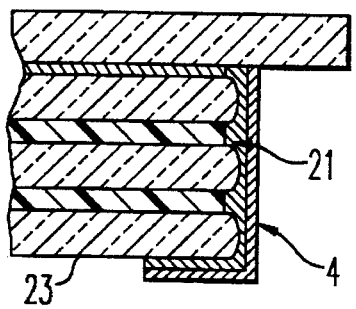
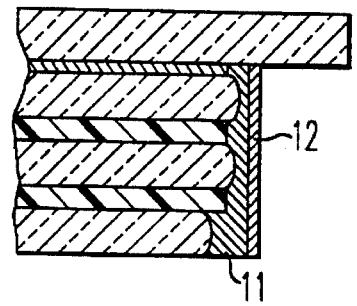
FIG. 2c
FIG. 2d
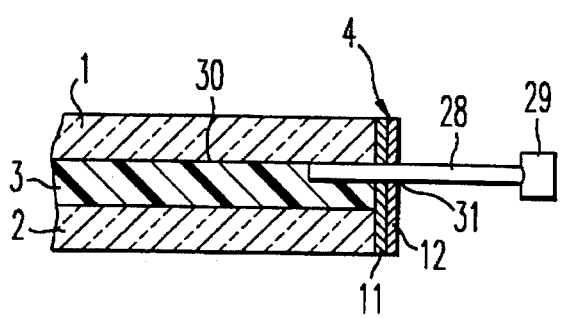
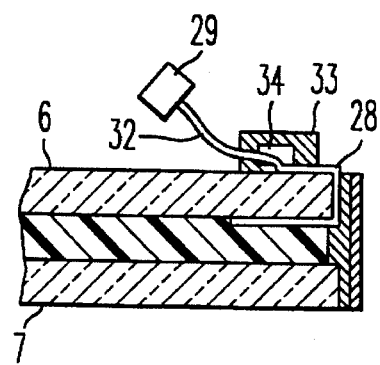
FIG. 4a
FIG. 4b

GLASS PANE HAVING A PERIPHERAL STRIP, AND METHOD OF MANUFACTURING SAME

BACKGROUND OF THE INVENTION

1. Field of the Invention

The invention relates to a laminated glass pane having at least one rigid glass sheet and one sheet of a flexible plastic material, particularly a glass pane produced in limited-run series production and having a peripheral strip. The invention also relates to a method of manufacturing such a glass pane.

2. Discussion of the Background

Glass panes used in the aircraft sector, the railroad sector, and/or tinted and/or shielded glass panes, heated windshields, and in general glass panes requiring special fabrication, are manufactured in limited-run series production.

If these laminated panes contain two rigid sheets as the exterior sheets they may be called symmetric, whereas panes in which one of the exterior sheets is rigid and the other is comprised of a flexible plastic material may be called asymmetric.

Flexible plastic sheets which are components of a laminated pane are intended to improve the properties of the pane. For example, a polyurethane plastic material may be used for an exterior sheet to confer surface properties such as scratch resistance, anti-sharding protection, etc. Sheets of polyurethane, polyvinyl butyral, or other materials may be used as intermediate sheets: in particular, a polyvinyl butyral intermediate sheet improves the shock absorption of the pane.

Assembly in limited serial production of the sheets which are components of a glass pane ordinarily involves the following steps. First, the sheets are placed in a hermetically sealed bag, under vacuum. The bag is placed in an autoclave having an interior pressure of 8 to 14 bar, with a temperature of 100° to 140° C. During the autoclaving, the plastic material tends to flow under the influence of the elevated temperature, whereby it may leak out over the edge of the pane.

After assembly, a mastic which provides a finish and/or protection is ordinarily applied to at least a part of the periphery of the pane. The process of applying this mastic is lengthy, requiring a number of stages:

application of masking means to the regions which are not to be coated with the mastic (particularly the border regions of the faces of the exterior sheets), application of the mastic, final configuration of the mastic with a putty knife or the like, and removal of the masking means.

Further, a step in which the mastic is polymerized is required.

SUMMARY OF THE INVENTION

The object of the present invention is to provide a laminated glass pane which is easier to fabricate, and in particular for which the realization of a strip for purposes of a finish and/or protection is easier. The invention further proposes a pane wherein the strip for purposes of a finish and/or protection is a barrier to leakage of the flexible plastic materials, particularly leakage resulting from flow of the plastic material under the influence of the elevated temperature during the autoclaving.

The invention relates to a laminated glass pane having at least one rigid sheet and one sheet of a flexible plastic material, which pane has a peripheral strip having two layers of respectively different materials. The strip is disposed over at least a part of the edge of the pane and over at least one edge of a flexible plastic sheet. A first layer of the strip, designated the "internal layer", is comprised of a material having a softening temperature which is less than or equal to the temperature employed in autoclaving the sheets which are components of the pane, and a second layer of the strip, designated the "external layer", is comprised of a material having a softening temperature which is greater than the temperature employed in autoclaving the sheets.

According to the invention the peripheral strip is applied before the autoclaving; in particular, it is applied over at least one sheet comprised of flexible plastic material, which sheet is a component of the pane and is applied before the autoclaving. The peripheral strip according to the invention is left on the pane during the autoclaving, and in particular, it is also left on during the use of the pane. Thus, the external layer serves as a barrier opposing leakage of the material of the flexible plastic sheet and at the same time serves as a strip for purposes of providing a finish and/or protection.

A finish strip is particularly useful if the laminated pane comprises more than two rigid sheets, particularly if the pane is a tinted or shielded pane. Such laminated panes often have alignment defects after assembly, which defects are unsightly and may impede the subsequent mounting of the pane in a window opening or the like. The presence of the peripheral strip according to the invention provides a pane edge which is smooth (aligned), is free of leakage and defects resulting from leakage, and has a finished appearance.

According to an advantageous variant, the inventive strip is comprised of a strip which mechanically protects edges of the pane which are apt to absorb shocks or impacts to which the pane may be subjected. Further, advantageously the strip constitutes a barrier which seals against water and water vapor. In practice, humidity can lead to de-lamination between a sheet of plastic material and the adjacent sheet(s).

The dimensions of the peripheral strip depend on the application envisaged. The length of the strip may be such that it extends along a part, or preferably all, of the perimeter of the pane. The strip may be such that it covers part or all of the edge of the pane, and it may also overlap to some extent over one or both of the faces of the pane. Preferably, the strip covers at least one edge of one sheet, which sheet is comprised of a flexible plastic material which tends to flow during the autoclaving. The thickness of the peripheral strip is preferably less than 3 mm, to avoid introducing a prominence which may impede mounting the pane on its support, e.g., if the pane has dimensions corresponding to the space provided for it in the opening in the vehicle body. However, if the strip is too thin the properties of the strip are more subject to deviate from the required values. The strip thickness is preferably in the range 0.8 to 3 mm.

The external strip layer is preferably comprised of a material having a softening temperature greater than the temperature used in the autoclaving. The external layer provides a barrier to leakage of the material of the flexible plastic sheet. For the usual conditions in an autoclave temperature of 100° to 140° C., the softening temperature of the external layer may be, e.g., in the range 145° to 190° C. The material of the external layer should have mechanical properties suitable to correct and adapt to any alignment defects. For example, the hardness may be in the range 70 to 90 Shore A. Preferably the elongation at failure is greater than 500%, and the tensile strength is greater than 10 MPa, both parameters measured according to the French Standard NF T 46-002, with test samples of type H3 dumbbell. At $-40°$ C. the external layer material should have an elongation at failure of greater than 200% and an initial Young's modulus in the range 200 to 300 MPa, again measured according to NF T 46-002. These low-temperature properties enable the pane to avoid damage in low-temperature service.

The material of the external strip layer is compatible with all materials which it will contact, including the internal layer and, e.g, a layer of adhesive used to bond the pane to an opening in the vehicle body, and/or a layer of material employed to form a seal or a mounting joint, e.g. an encapsulated or extruded joint.

Advantageously, the material of the external layer is impermeable to water and water vapor. It may be a thermoplastic elastomer, particular an elastomer chosen from the group consisting of polyvinyl chloride, thermoplastic polyurethanes, rubber, NEOPRENE, and polyethylene (PET).

This external layer is fixed to the sheets which are components of the pane with the aid of an internal layer which can soften during the autoclaving and can adhere to the sheets. In the usual conditions of use, with the temperature in the range $100°-140°$ C., the softening temperature of the material comprising the internal layer is in the range $80°$ to $140°$ C. The adhesion of the peripheral strip to the pane is improved by the fact that, to a greater or lesser extent, the material can fill in recesses present due to defective alignment of the sheets comprising the pane.

Being that the peripheral strip is applied to the sheets prior to autoclaving of the pane, it is necessary, particularly if the strip extends along the entire periphery of the pane, that passages be provided to allow escape of gases liberated during the assembly. According to an advantageous embodiment, the material comprising the internal layer is permeable to air and water vapor, thereby allowing these gaseous materials to escape without detriment to the quality of the assembly. Additional means may be provided to facilitate degassing. The material of the internal layer is also compatible with all other materials which it contacts, particularly the material of the external layer and the material of the flexible plastic sheet.

The part of the sheets in contact with the peripheral strip according to the invention may be coated with one or more layers of organic and/or mineral materials. These layers may comprise enamel, metal, metal-oxide-based material, silane-based material, or siloxanes. The material of the internal layer should be compatible with that of the layer with which it is in contact, and also should adhere to the latter.

The material of the internal layer is, for example, polyvinyl butyral or thermoplastic polyurethane.

According to one embodiment of the invention, the peripheral strip is comprised of two strips or bands of different materials. The two component strip elements of the peripheral strip are assembled together in advance, preferably by adhesion at elevated temperature, and are subsequently applied to the sheets comprising the pane at a chosen facility or work site. An opening may be provided in the strip to allow passage of a functional element such as an electrical connector extending to the exterior of the pane.

The invention also relates to a method of manufacturing glass panes according to the invention, in which, prior to autoclaving of the sheets which are components of the pane (at least one of the sheets being a flexible sheet comprised of plastic material), one applies a peripheral strip to at least a part of the edge of the pane, wherewith the strip is comprised of two layers:

an internal layer comprised of a material the softening temperature of which is less than or equal to the temperature employed in the autoclaving of the sheets which are components of the pane, and an external layer comprised of a material the softening temperature of which is greater than the temperature used in the autoclaving of the sheets. The peripheral strip may be at least temporarily held over the pane with the aid of appropriate means such as, in particular, adhesive band(s). These means are removed after the assembly, the peripheral strip now being fixed to the pane with the aid of, in particular, the internal layer.

The invention may be advantageously applied to the manufacture of panes comprised of at least three rigid sheets and two intermediate sheets, such as tinted or shielded panes.

Other characteristics and advantages of the invention will become apparent from the following description with reference to exemplary embodiments and to the drawings.

BRIEF DESCRIPTION OF THE DRAWINGS

FIGS. 1a–1f are cross-sections representing various possible positions of the strip according to the invention, prior to assembly;

FIGS. 2a–2d are cross-sections showing various possible configurations of the strips according to the invention fixed to a tinted or shielded glass pane, after assembly;

FIGS. 4a–4b show an output means for a functional element of the glass pane, which element requires connection to devices exterior to the glass pane.

DETAILED DESCRIPTION OF THE PREFERRED EMBODIMENTS

Figure 3A:
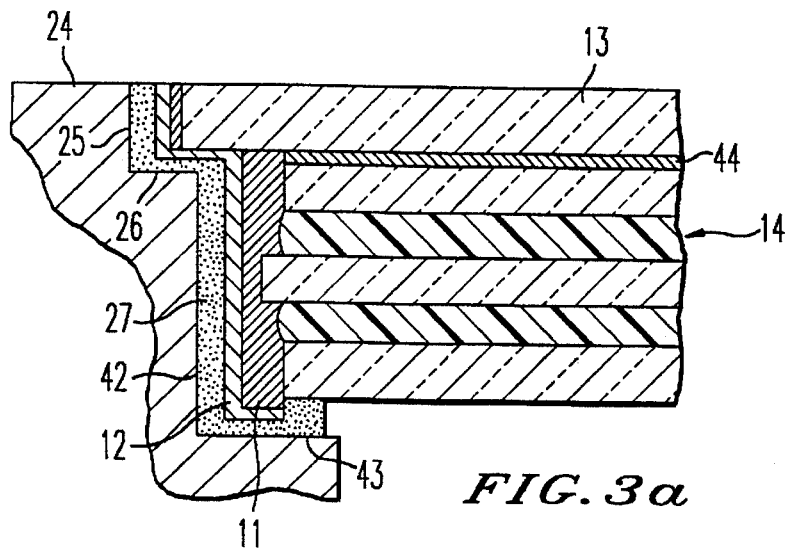
FIGS. 3a–3c show variants of tinted or shielded glass panes according to the invention which have been mounted in a vehicle.

FIGS. 1a–1f show various embodiments of the peripheral strip according to the invention applied to a glass pane. The pane may be a laminated pane having two rigid sheets (1, 2) comprised of mineral or organic glass material, sandwiching a sheet 3 comprised of flexible plastic material. The peripheral strip 4 according to the invention may completely cover the edge 5 of the pane, and may at least partially cover the faces 6 and 7 of sheets 1 and 2, respectively, as shown in FIG. 1a.

Alternatively, strip 4 may partially cover only one of the faces of the pane, e.g. face 6, as shown in FIG. 1b, or neither of the faces (6, 7), as shown in FIG. 1c.

The peripheral strip 4 may cover only a part of the edge of the pane, as shown in FIG. 1d to 1f. The strip covers at least the entire edge of the flexible plastic sheet 3, in order to prevent leakage of the intermediate sheet 3 onto the edge of the pane during autoclaving. The peripheral strip 4 may cover all of the edge of one of the rigid sheets 1 or 2, e.g. sheet 1, along with edge 9 of the intermediate sheet 3, while covering only a part of the edge 10 of the other rigid sheet, e.g. sheet 2, as shown in FIGS. 1d and 1e. In FIG. 1d the strip overlaps the face 6 of sheet 1 to a certain extent. FIG. 1e shows the strip not overlapping the face 6. It is also possible to have the strip covering only the edge 9 of the intermediate sheet 3. For reasons of convenience and to provide improved adhesion, preferably the strip extends over edges 8 and 10 of sheets 1 and 2, respectively, to a certain extent, as shown in FIG. 1f.

These figures illustrate only some of the possible configurations of the strip 4. Obviously, other configurations as possible without departing from the scope of the invention. It is obvious that the strip may cover all or a part of the perimeter of the pane, independently of the extent of coverage of the edge thickness dimension.

The strip 4 according to the invention has (in the described structures) two strip elements (11, 12) which are preassembled together. Preferably the strip elements are rectangular strips. The external strip element 12 is comprised of a material described as hard, which does not soften during the autoclaving of the pane, whereas the internal strip element 11 tends to soften during the autoclaving.

FIGS. 2a–2d show advantageous applications of the peripheral strip to a tinted or shielded glass pane. Typically, a tinted or shielded glass pane is comprised of an exterior sheet 13 of mineral glass which extends beyond the periphery of a tinted or shielded assembly 14 to which sheet 13 is bonded by the intermediary of an adhesive layer 44. Assembly 14 is comprised of a plurality of rigid sheets (15, 16, 17) between which there are sandwiched respective intermediate sheets comprised of flexible plastic material (18, 19). For the sake of convenience, only three rigid sheets and two intermediate sheets are shown; however, there may be as many as eight rigid sheets. The peripheral strip 4 may cover the entire edge of the pane, i.e. the edge 20 of the rigid sheet 13 and the edge 23 of the tinted or shielded assembly, as shown in FIGS. 2a and 2b. According to an advantageous variant, only the edge 21 of the assembly 14 is covered, as shown in FIGS. 2c and 2d. The strip 4 may also overlap both faces (22, 23) of the glass pane, as shown in FIG. 2a, or only one face, as shown in FIGS. 2b and 2c; or neither face, as shown in FIG. 2d.

The strip 4 is comprised of two strip elements (11, 12). Element 12, the external element, is comprised of, e.g., polyurethane, having a softening point on the order of 180° C. It is preferably colored, e.g. black. Its hardness is, e.g., on the order of 85±5 Shore A. The strip combines the properties of rigidity, in order to correct the defects in alignment of the sheets 15 to 19 comprising the tinted or shielded assembly, and flexibility in order to adapt to the defects (in combination with the internal strip element). The strip is fixed to the glass pane with the aid of strip element 11, which element 11 is comprised of, e.g., polyurethane having a softening point on the order of 100° C. Element 11 is, e.g., colorless.

Element 11 has a thickness of, e.g., 0.30 to 1.5 mm; element 12 has thickness 0.5 to 1 mm. These thicknesses are the values prior to the autoclaving.

During the autoclaving, the material of element 11 flows, and to some extent fills in the depressions resulting from misalignment of the sheets of which the tinted or shielded assembly is comprised. This reconfiguration improves the adhesion.

Figure 3B:
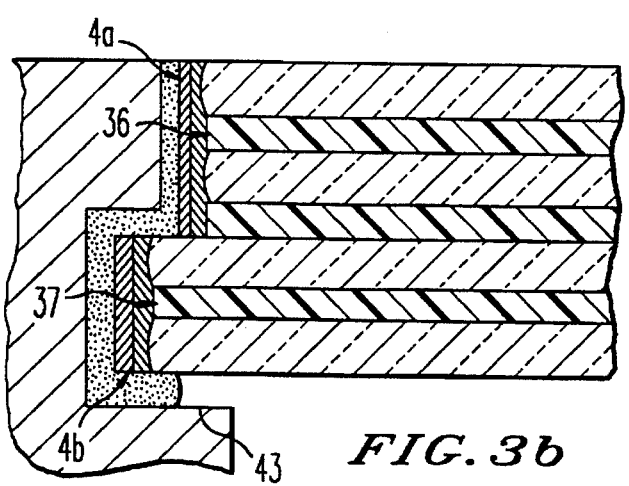
Figure 3C:
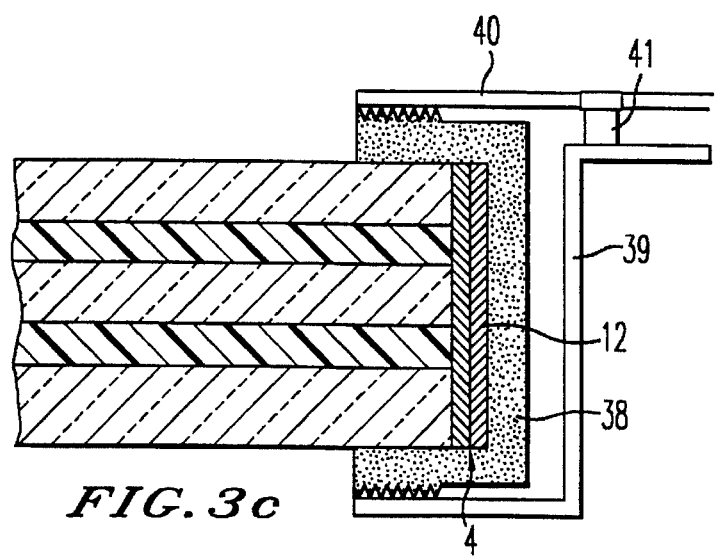

FIGS. 3a to 3c are schematics of various tinted or shielded panes mounted in an opening in a vehicle body having wall surfaces 24, 25, 26, 42, and 43. FIG. 3a shows such a pane wherein the sheet 13 is aligned with the wall surface 24 of the opening. The pane is fixed to the walls of the opening with the aid of a layer of adhesive 27 comprised of a polyurethane mastic or a silicone joint. The adhesive layer 27 is in contact with the strip 4 according to the invention and the wall 42 of the opening. Strip 4, in particular strip element 12, is compatible with and adheres to adhesive layer 27.

FIG. 3b illustrates another variant according to which two strips according to the invention (4a, 4b) are applied to two edges (36, 37) of a group of sheets which are components of a glass pane. In this figure, edge 36 is an edge formed from the edges of two rigid sheets and two flexible plastic sheets. Edge 37 is an edge formed from the edges of two rigid sheets and one flexible plastic sheet. Obviously, other configurations are possible within the scope of the invention.

FIG. 3c shows a pane around which a joint 38 is mounted over at least part of the periphery of the pane. The joint may be molded or extruded over the pane, or may be extruded or otherwise produced separately and then fixed to the pane. The external strip element 12 is compatible with the material of the joint, and may adhere to the joint originally or by processing. A frame 39 and a mounting flange 40 or other mounting means may be installed near the pane to rigidify it. The frame and flange are assembled with the aid of fastener means 41, e.g. a screw.

FIG. 4 illustrates another variant of the invention. It is a heated (or heating) laminated glass pane, optionally tinted or shielded. An electrical conductor 28 connects the heating network (not shown) to a device outside the pane, e.g. a power supply 29 (shown only schematically). Preferably the conductor 28 is embedded in the flexible plastic intermediate sheet 3 near the face 30 of the rigid glass sheet 1. It may be comprised of a foil, for example, such as a thin strip of plated copper. The edge of the pane is covered by a peripheral strip 4 according to the invention. In FIG. 4a, an opening 31 has been provided in strip 4 to allow the conductor 28 to extend outside the pane. FIG. 4b shows another variant, wherein a connecting element is provided to connect conductor 28 to a cable 32 which in turn connects to the power supply 29. The connecting element may be, e.g., an element 33, e.g. a plastic box, fastened or adhesively bonded to one face (6 or 7) of the pane, and containing a suitable junction device 34 which enables the cable 32 to be connected to the conductor 28.

An example is provided below to illustrate the adhesion of the internal layer to the edge of the pane, in particular the adhesion of the internal layer to a flexible plastic sheet and to the edge of a glass sheet. Good adhesion enables good fixing of the peripheral strip to the edge of the pane, and in addition improves the barrier function against leakage of the flexible plastic material from the sheets which are components of the pane assembly. Moreover, good adhesion improves the water- and air-tightness of the pane.

The values of adhesion measured on an internal strip element according to the invention were ≧64N with respect to the edge of a glass sheet, and ≧200N with respect to the edge of a flexible plastic sheet. These values were measured by the so-called "peeling test" method.

EXAMPLE

Two angle profile strip elements for use as internal strip elements according to the invention were fabricated, one being an internal strip element comprised of polyurethane with softening point of 125° C., having a thickness of about 1.20 mm, and the second being an external strip element comprised of polyurethane with softening point of 180° C., having a thickness of about 0.6 mm. The two strip elements were adhesively bonded together by thermal bonding. The width of the strips was 1 cm. One strip element was positioned on one face of a ground glass plate (simulating the characteristics of the edge of a glass sheet); the other was positioned on one face of a flexible sheet of plastic material, namely polyvinyl butyral. Each combination of plate and strip element was subjected to a temperature of at least 150° C., simulating the conditions during autoclaving of a laminated glass pane. The strip elements were then peeled away perpendicularly to the glass plate (or the polyvinylbutyral sheet, respectively), at a speed of 2 cm/min, under temperature conditions of 20°±1° C.

A force of 64N was necessary to detach the strip element bonded to the glass sheet. With the strip element applied to the polyvinyl butyral sheet, the strip element was not detached until the materials in contact themselves experienced de-cohesion.

The same test was applied to a second strip element which was subjected to accelerated aging for 15 hr at 54° C. and 100% relative humidity. Thereafter, the force needed to detach the strip element bonded to the glass sheet was 15N. With the strip element applied to the polyvinyl butyral sheet, again the strip element was not detached until the materials in contact themselves experienced de-cohesion.

These tests demonstrate the adhesive properties of the peripheral strips according to the invention.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A laminated glass pane prepared by autoclaving, said laminated glass pane comprising:
   (a) a rigid glass sheet having an edge;
   (b) a flexible plastic sheet having an edge; and
   (c) a peripheral strip disposed over at least a portion of said rigid glass sheet edge and over said flexible plastic sheet edge, wherein said peripheral strip comprises a first layer in contact with said rigid glass sheet edge and said flexible plastic sheet edge and having a softening temperature less than or equal to the temperature employed in said autoclaving, and a second layer in contact with said first layer and having a softening temperature greater than the temperature employed in said autoclaving; and
   wherein the softening temperature of the first layer is in the range of about 80° to 140° C., and the softening temperature of said second layer is in the range of about 145° to 190° C.

2. The laminated glass pane of claim 1, wherein said first layer comprises polyvinyl butyral or thermoplastic polyurethane.

3. The laminated glass pane of claim 1, wherein said second layer comprises a thermoplastic elastomer.

4. The laminated glass pane of claim 3, wherein said thermoplastic elastomer is selected from the group consisting of polyvinyl chloride, thermoplastic polyurethanes, heat-setting polyurethanes, polyethylene, NEOPRENE, and rubber.

5. The laminated glass pane of claim 1, wherein said first and second layers are bonded together.

6. The laminated glass pane of claim 1, wherein the thickness of said peripheral strip is less than 3 mm.

7. The laminated glass pane of claim 6, wherein said thickness is 0.8 to 3 mm.

8. The laminated glass pane of claim 1, wherein said second layer has a hardness of 70–90 Shore A, an elongation at failure greater than 500% and a tensile strength greater than 10 MPa.

9. The laminated glass pane of claim 1, wherein said rigid glass sheet has a face and wherein said first layer of said peripheral strip is in contact with said rigid glass sheet face.

10. The laminated glass pane of claim 1, further comprising an opening in said protective strip to allow passage of a functional element requiring connection to a device outside the pane.

11. The laminated glass pane of claim 1, wherein said pane is a tinted or shielded pane.

12. A method for manufacturing the laminated glass pane of claim 1, comprising the steps of:
    assembling said rigid glass sheet having an edge, said flexible plastic sheet having an edge, and said peripheral strip in contact with at least a portion of said rigid glass sheet edge and over said flexible plastic sheet edge to form a preassembled laminated glass pane, and
    autoclaving said preassembled laminated glass pane, wherein said peripheral strip is adhesively attached to said portion of said rigid glass sheet edge and over said flexible plastic sheet edge.

13. The method of claim 12, further comprising thermally bonding said first and second layers of said peripheral strip prior to contacting said strip with said portion of said rigid glass sheet edge and over said flexible plastic sheet edge.

* * * * *